US007023902B2

United States Patent
Sih et al.

(10) Patent No.: US 7,023,902 B2
(45) Date of Patent: Apr. 4, 2006

(54) APPARATUS AND METHOD FOR SCALABLE OFFLINE CDMA DEMODULATION

(75) Inventors: Gilbert Christopher Sih, San Diego, CA (US); Ziad Mansour, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 891 days.

(21) Appl. No.: 10/007,543

(22) Filed: Nov. 6, 2001

(65) Prior Publication Data

US 2003/0086481 A1    May 8, 2003

(51) Int. Cl.
*H04K 1/00*    (2006.01)

(52) U.S. Cl. .................. 375/147; 375/150; 370/335; 370/342

(58) Field of Classification Search ................ 375/130, 375/147, 150; 370/335, 342, 441

See application file for complete search history.

(56) References Cited

U.S. PATENT DOCUMENTS

| 6,650,694 | B1 * | 11/2003 | Brown et al. ............... 375/150 |
| 2001/0028676 | A1 * | 10/2001 | Ohsuge ..................... 375/148 |
| 2001/0036195 | A1 * | 11/2001 | Garyantes et al. .......... 370/441 |

* cited by examiner

*Primary Examiner*—Temesghen Ghebretinsae
(74) *Attorney, Agent, or Firm*—Philip R Wadsworth; Charles D Brown; George C Pappas (57) ABSTRACT

Techniques for scalable CDMA demodulation with maximum response latency are disclosed. In one aspect, a finger timing unit generates signals indicating cycle boundaries for a plurality of fingers, and an offline processing unit processes stored samples for those fingers in response to the signals. In another aspect, incoming samples are stored in a RAM, while finger timing is maintained using a plurality of counters. The RAM address is stored on symbol boundaries. Symbols for each finger are generated in an offline processing unit, clocked at a higher speed than the finger counters, from a RAM location computed using the stored RAM address. Various other aspects are also presented. These aspects provide for decoupling of the chip rate processing from chip time, which allows a single offline processing unit to service a plurality of fingers, thus reducing additional hardware required to support additional fingers while maintaining maximum latency requirements.

22 Claims, 7 Drawing Sheets

PRIOR ART

FIG. 3B

PRIOR ART

APPARATUS AND METHOD FOR SCALABLE OFFLINE CDMA DEMODULATION

FIELD

The present invention relates generally to communications, and more specifically to a novel and improved apparatus and method for scalable offline CDMA demodulation.

BACKGROUND

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

In general, the performance of any CDMA system is enhanced as more fingers are added to receivers in order to process a greater number of multipath signals from one or many base stations. This is particularly true as the chip rate used to spread incoming signals increases, as more components of the multipath signal are then distinguishable at the receiver. Other methods to improve performance, such as receive diversity, in which multiple antennas are used to track received signals, require an increase in the number of fingers.

CDMA demodulators often include dedicated hardware, known as finger front ends, to process the relatively higher chip rate data that is received. Often a digital signal processor (DSP) or other processor is deployed to receive symbol rate data from the finger front end to further demodulate the symbols. One way to enhance the performance of any CDMA system, or to meet specifications for a higher chip rate system, is to replicate the hardware of one finger for as many fingers as are required. While this technique has been used with success in the past, as finger requirements grow, the resultant hardware requirements grow linearly in proportion to the number of fingers. Multiplying hardware for each finger can become prohibitively expensive.

In addition, a CDMA system may require certain minimum response times from a receiver to respond to a transmitted signal. This may impose a maximum latency allowed in demodulating received signals. One example is the forward power control bit punctured into the forward link data streams, as defined in the IS-95 and cdma2000 standards. Since CDMA systems are typically capacity constrained by interference generated by users within the system, to maximize capacity it is imperative that each mobile station responds to power control signals in a timely fashion to ensure that each user transmits only the necessary amount of power, thus minimizing interference.

There is therefore a need in the art for a CDMA demodulator that can be scaled to include additional fingers in a hardware efficient manner while maintaining any maximum demodulation latency requirements imposed by the system.

SUMMARY

Embodiments disclosed herein address the need for CDMA demodulators that can be scaled to include additional fingers in a hardware efficient manner while maintaining maximum demodulation latency requirements. In one aspect, a finger timing unit generates signals indicating cycle boundaries for a plurality of fingers, and an offline processing unit processes stored samples for those fingers in response to the signals. In another aspect, incoming samples are stored in a RAM. Finger timing for a plurality of fingers is maintained using a plurality of counters. On symbol boundaries, indicated by decoding particular states of the counters, the address for the RAM is stored. Symbols for each finger are generated in an offline processing unit that is clocked at a higher speed than the finger counters. The location in the RAM for the samples to be processed for a finger is computed using the stored RAM address. In yet another aspect, a memory mapped PN generator is indexed using a time reference value stored on a symbol boundary. Various other aspects are also presented. These aspects provide for decoupling of the chip rate processing from chip time, which allows a single offline processing unit to service a plurality of fingers. Additional fingers can be supported with minimal additional hardware. Meanwhile, independent control of each finger's time reference allows for response times within maximum latency requirements.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
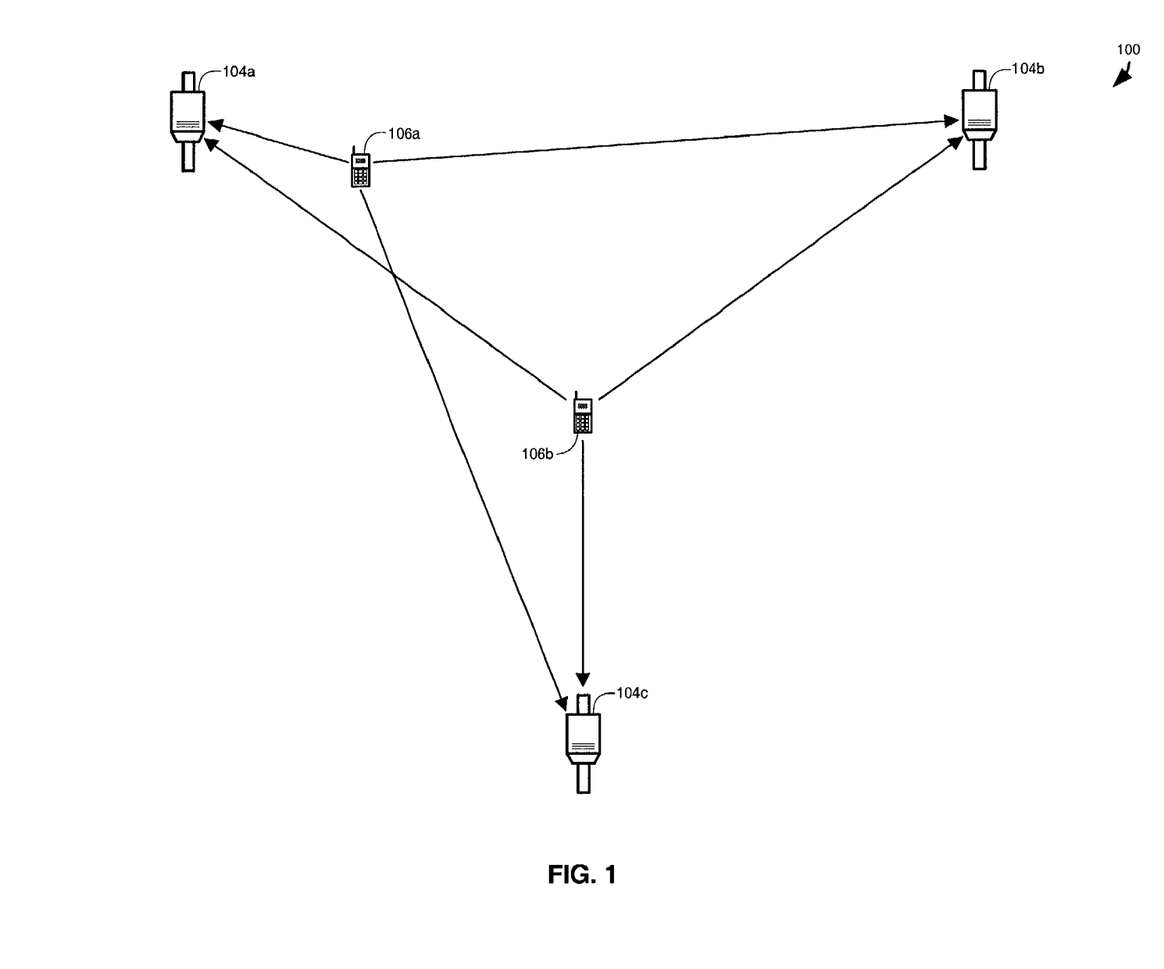
FIG. 1 is a wireless communication system that supports a number of users, and which can implement various aspects of the invention.

FIG. 1 is a diagram of a wireless communication system 100 that supports a number of users, and can implement various aspects of the invention. System 100 may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the term access point. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Figure 2:
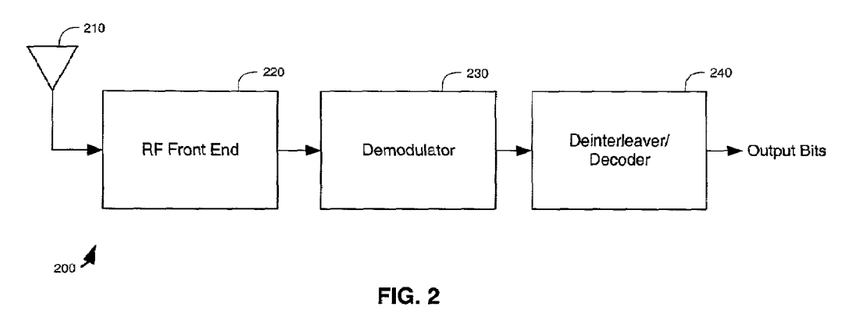
FIG. 2 depicts a CDMA receiver.

FIG. 2 depicts receiver 200. Receiver 200 may be a component of a mobile station 106 (or a base station 104, if the reverse link is defined similarly). For clarity, only the components of the receiver involved in the following description of this embodiment are shown. Signals arrive at antenna 210 and are downconverted in RF front end 220. Antenna 210 may comprise multiple antennas for diversity reception. A variety of RF downconversion techniques are known in the art. Resultant I and Q samples are delivered to demodulator 230. Demodulated symbols from demodulator 230 are delivered to deinterleaver/decoder 240, where deinterleaving and decoding are performed to produce the output bits. A variety of interleaving and deinterleaving techniques are known in the art, as are techniques for encoding and decoding. Exemplary decoding techniques include Viterbi decoding and turbo decoding.

Figure 3A:
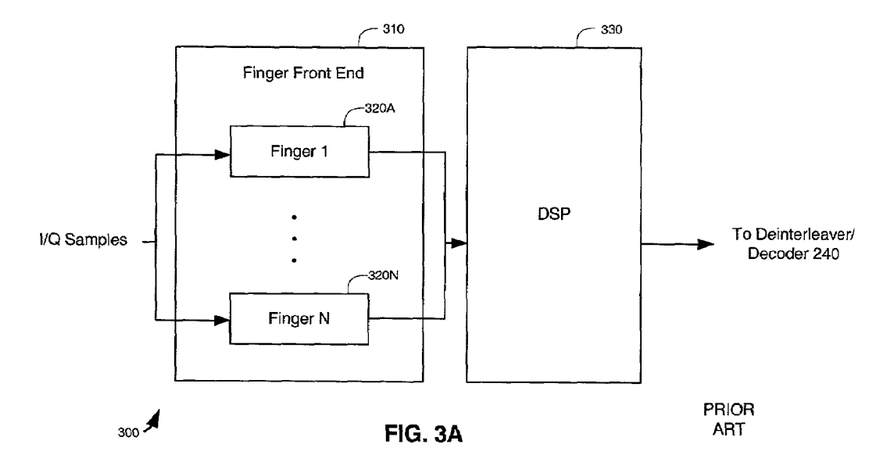
FIGS. 3A and 3B depict a real-time CDMA demodulator.

It is a common technique to dedicate specific hardware in a finger front end module to perform chip rate processing and to use a DSP to perform the relatively slower symbol rate processing. FIG. 3A depicts one such configuration of a demodulator 300. Note that demodulator 300 can be deployed in place of demodulator 230 in FIG. 2 to produce a prior art receiver. Finger front end 310 comprises N fingers, 320A–320N, respectively. I/Q samples are delivered to the fingers, where each finger is assigned to track a multipath component. When one of fingers 320A–320N has processed a symbol, it can interrupt DSP 330 to deliver the symbol for symbol rate processing. DSP 330 can be used to control and provide configuration for fingers 320A–320N.

The symbols provided from each of the fingers 320A–320N are further demodulated in DSP 330, and the resultant demodulated symbols are combined using knowledge of the time offset between the streams of symbols arriving from the fingers. The combined symbols are delivered to deinterleaver/decoder 240 for deinterleaving and decoding.

Figure 3B:
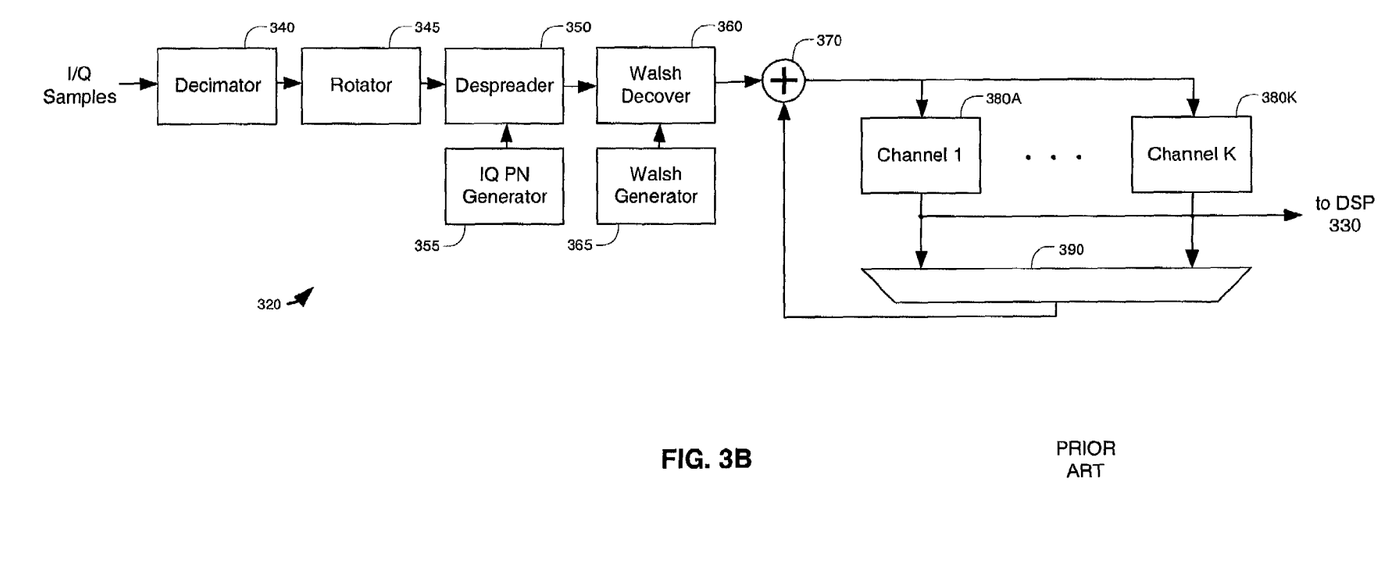

FIG. 3B further details a finger 320. I and Q samples arrive at decimator 340. A common rate of sample delivery is eight times the chip rate, referred to herein as chip×8. Other sample rates can be used as well. The input sample stream is decimated in decimator 340 to produce the correct sampling phase. The results are delivered to rotator 345 for frequency adjustment (a rotator is optional). The decimated, rotated samples are then despread in despreader 350 using PN samples generated in IQ PN generator 355. The despread samples are then decovered in Walsh decover 360 using Walsh sequences generated in Walsh generator 365.

A mobile station may be configured to receive more than one channel at one time. For example, a mobile may receive the fundamental data channel, a supplemental data channel, and a control channel simultaneously. Each channel is separated using a unique Walsh code in Walsh decover 360. Several portions of finger 320 can be time-shared to decover several channels. The chips for each channel are accumulated until a symbol's worth of chips have been processed. The intermediate results are stored in channels 1 through K, 380A through 380K, respectively. As each despread and decovered chip is produced in Walsh decover 360, the corresponding partial accumulation value is retrieved from one of the channels, 380A–380K, via multiplexor 390. The partial accumulation value is summed with the output of Walsh decover 360 in summer 370, and the result is stored in the appropriate channel 380A–380K. DSP 330 has access to the values stored in channels 1 through K, 380A–380K. After a symbol's worth of chips are despread, decovered, and accumulated, DSP 330 can proceed to perform symbol rate demodulation on the symbols and combining of the symbols from the various fingers 320A–320N. The DSP 330 commonly handles the time tracking and frequency tracking synchronization loops, as well as power control processing (described in further detail below).

In the exemplary embodiment, the number of accumulators in each finger, given by K, is 6. There are three used for the fundamental and secondary data channels and the control channel. In addition, a fourth accumulator tracks on-time pilot symbols for data demodulation, a fifth receives time-offset pilot symbols for time-tracking the finger, and a sixth is available for receiving an auxiliary pilot signal.

Finger front ends are typically equipped to handle some number of channels or multipath signals simultaneously, and support for a greater number of channels provides increased performance. A common technique to increase channel support is to simply duplicate a single finger's hardware to provide support for as many fingers as desired. However, as the number of channels supported grows, the associated hardware can become prohibitively expensive.

Any demodulator designed to allow an increased number of fingers must also meet certain demodulation latency requirements. In some cases, control information is transmitted to the receiver that will require an action to be taken within a certain amount of time. This time limit sets a boundary on the delay that can be introduced in demodulating received data.

As mentioned above, one such maximum latency requirement applies to power control in cdma2000 systems. In these systems, power control symbols are punctured into the forward link symbol stream to control the power level transmitted by the mobile to the base station on the reverse link. The cdma2000 performance specification (TIA/EIA/IS-98) requires that the mean output power of a mobile station be within 0.3 dB of its final value in less than 500 microseconds following the reception of a valid power control bit.

This requirement places a timing restriction on the demodulation and combining of power control bits. As soon as the power control bit is received on any finger, it must be processed so that the transmitter power level can be set as soon as possible. Typically the chip-rate demodulation function operates to accumulate symbols from chips, without knowledge of whether a particular symbol is a power control symbol or not. Further symbol rate demodulation will be performed to determine when a power control symbol is received, and the appropriate action to take in response. This implies that the architecture used to demodulate a CDMA system must have a timing signal per finger to allow processing of symbols as soon as they are received.

Figure 4:
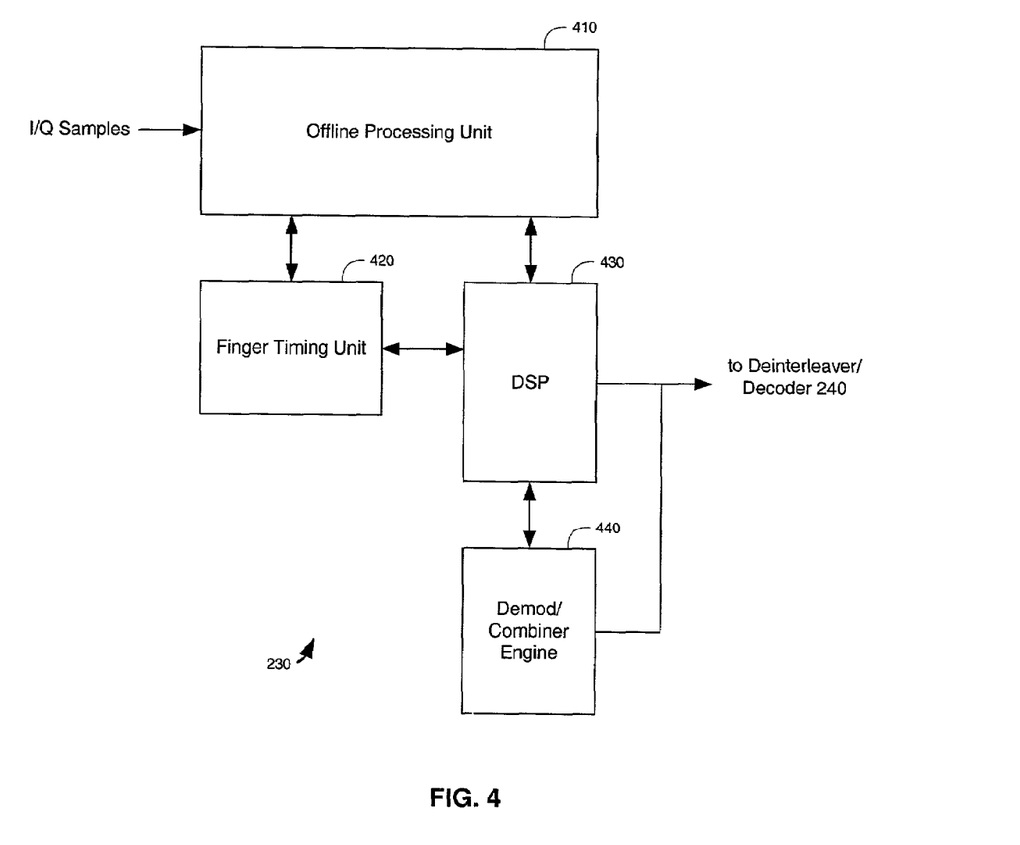
FIG. 4 depicts an offline CDMA demodulator configured in accordance with the present invention.

FIG. 4 depicts an exemplary embodiment of demodulator 230. As will be described further below, demodulator 230 can be deployed to support a large number of fingers efficiently. Additional finger support can be added without introducing a complete finger, such as finger 320 described above in FIG. 3B. Furthermore, demodulator 230 provides the means to maintain finger timing in such a way that demodulation latency can be tailored to meet the standards required, such as the power control requirement of cdma2000 systems, described above.

Demodulator 230, in FIG. 4, comprises an offline processing unit 410, a finger timing unit 420, a DSP 430, and an optional demod/combiner engine 440. I and Q samples are received and stored in offline processing unit 410. Offline processing unit 410 can then be run much faster than a real-time finger because its input data is stored in RAM. This allows the hardware to read samples out of the RAM much faster that the rate at which they are stored into the RAM. Since the hardware is no longer constrained by the input data rate, the processing requirements of a multiple-finger real-time architecture, such as demodulator 230 shown in FIGS. 3A and 3B, can be replaced by a single offline processing unit 410 that is clocked faster than a real-time finger.

Finger timing unit 420 maintains timing for each of the fingers supported by offline processing unit 410. As will be detailed further below, very little hardware needs to be added to finger timing unit 420 to support additional fingers. Finger timing unit communicates with DSP 430, providing finger timing information and receiving time-tracking adjustments. Offline processing unit 410 receives finger specific signals from finger timing unit 420, and provides accumulated symbols for all the supported fingers to DSP 430. DSP 430 may also provide configuration and control signaling to offline processing unit 410.

DSP 430, in addition to the functions just described, receives symbols from offline processing unit 410 and performs symbol level demodulation and combining of the symbols from various fingers. The results are delivered to deinterleaver/decoder 240. Demod/combiner engine 440 is an optional block that can be useful to offload relatively high rate symbol demodulation from DSP 430. For example, the supplemental channel may carry symbols with a duration as low as four chips per symbol. Compared with 64-chip or 128-chip symbols, a four-chip symbol stream will generate a much higher interrupt rate and subsequent processing requirements. Demod/combiner engine 440 can be deployed in tandem with DSP 430 if it is desired to remove this relatively high interrupt processing from DSP 430. The output of demod/combiner engine 440 is also delivered to deinterleaver/decoder 240.

Figure 5:
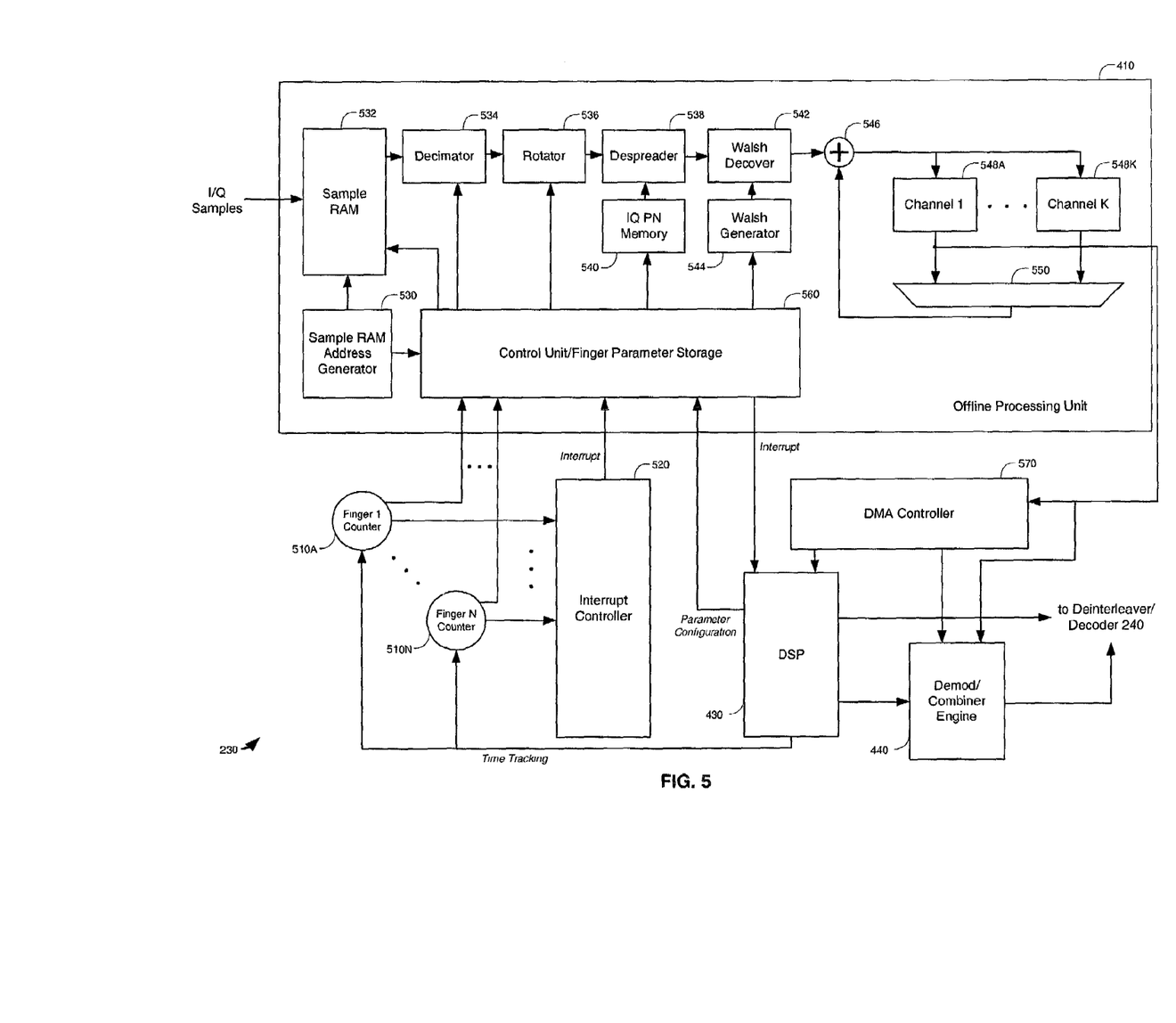
FIG. 5 is a detailed embodiment of an offline CDMA demodulator.

FIG. 5 depicts a more detailed embodiment of demodulator 230. Blocks 530–560, detailed below, are part of offline processing unit 410. Finger 1 counter through finger N counter, 510A–510N respectively, and interrupt controller 520 essentially make up finger timing unit 420 (not shown in FIG. 5). DSP 430 and optional demod/combiner engine 440 function substantially as described above with respect to FIG. 4. DMA controller 570 is also included in the embodiment of FIG. 5. Note that the division of FIG. 5 blocks in reference to FIG. 4 is for discussion purposes only, as modifications to the subsets fall within the scope of the present invention.

Contrasting with the real-time demodulator 300, shown in FIG. 3, demodulator 230 replaces the N real-time fingers with a single offline processing unit that is clocked on the order of N times faster than a real-time finger. For example, if a real-time finger, as shown in FIG. 3, is clocked at chip×8=9.8304 MHz, and four fingers are desired, then the offline processing unit should be clocked at least as fast as 39.3216 MHz. Alternatively, adding more hardware, essentially reintroducing an element of parallelism, can reduce the clock rate. For example, doubling the number of adders, as described more fully below, would allow the required rate to be reduced by a factor of two. Those of skill in the art, using the description disclosed herein, will recognize how to trade off clock speed of the offline processing unit 410 with additional hardware introduced therein.

Figure 6:
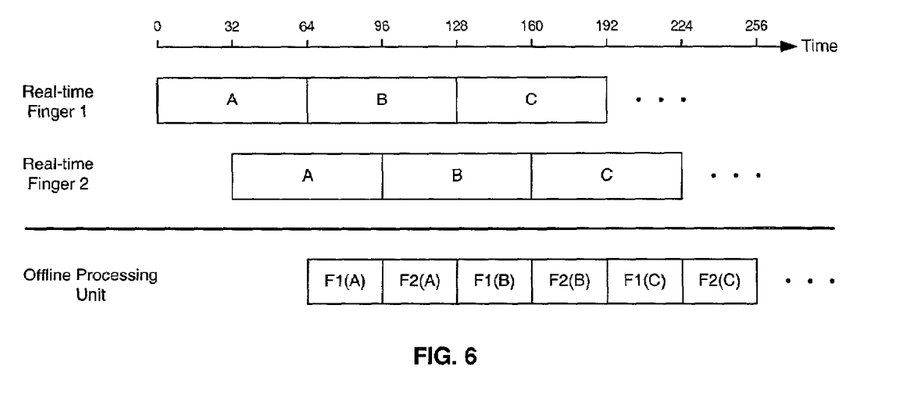
FIG. 6 contrasts the timing of symbol processing between a real-time demodulator and an offline processing unit.

FIG. 6 shows an example timeline contrasting how symbols are processed using a real-time architecture with an exemplary embodiment of an offline demodulator deploying two fingers. Two fingers are used for clarity of discussion only, as any number of fingers can be supported within the scope of the present invention. In a real-time demodulator, finger 1 will finish processing a symbol A at time 64, a symbol B at time 128, and a symbol C at time 192. Finger 2, in this example, is tracking a path delayed from finger 1. Finger 2 finishes symbol A at time 96, symbol B at time 160, and symbol C at time 224.

In this example, offline processing unit 410 is being clocked twice as fast as either of the real-time fingers, so it finishes processing a symbol twice as fast. Since the samples are stored in RAM (described below), the processing is slightly delayed from the real-time case, because processing does not begin until all the samples constituting a symbol are stored (this is not mandatory, but makes the implementation simpler). At time 64, all the samples required to process symbol A for finger 1 are available, so the offline processing unit 410 has its parameters set up for finger 1 and processes symbol A from time 64 to time 96. At time 96, the samples necessary to process symbol A on finger 2 are available in RAM, so the offline processing unit is configured for finger 2 processing and processes symbol A for finger 2 from time 96 to time 128. At time 128, the samples necessary to process symbol B on finger 1 are available in RAM, so the offline processing unit is configured for finger 1 and processes symbol B from time 128 to time 160. This example illustrates how a single processing unit can be time-shared to handle processing for two fingers, and those of skill in the art will recognize how to apply this to any number of fingers.

Returning to FIG. 5, I and Q samples are stored in sample RAM 532. In the exemplary embodiment, the samples are delivered at a rate of chip×8. The samples are continuously stored into sample RAM 532 using a circular buffer approach. In an alternative embodiment, to reduce the storage requirement, the samples are decimated down to a lower sampling rate before storage, and are interpolated back to chip×8 after reading. The size of the sample RAM is proportional to the amount of time spent in offline processing. For example, if one symbol is processed at a time, the sample RAM needs to hold roughly two symbols worth of data to ensure that all the fingers have access to the samples before they are replaced. More than one sample at a time can be processed in offline processing unit 410, but the sample RAM 532 will need to grow proportionally. In addition, as discussed above, maximum latency requirements of a system may limit the amount of offline processing performed, due to the increase in delay from sample storage to symbol demodulation. Sample RAM 532 is addressed using addresses from sample RAM address generator 530, the addresses of which are available to control unit/finger parameter storage 560 as well (described below).

As the I and Q samples are read from sample RAM 532, the subsequent processing is similar to the processing described above in FIG. 3B for a single real-time finger 320. Decimator 534 is used to decimate the sample stream to produce the correct sampling phase. Rotator 536 is optional, and can be used to provide frequency adjustment. Decimated and optionally rotated symbols are despread in despreader 538, using I and Q PN sequences generated in IQ PN memory 540. In the exemplary embodiment, the I and Q PN sequences are stored in IQ PN memory 540, and I and Q PN generation is accomplished by reading the appropriate PN values from IQ PN memory 540 in sequence (described further below). Despread samples are decovered in Walsh decover 542 using Walsh sequences generated in Walsh generator 544. (Other covering sequences, such as orthogonal variable spreading factor (OVSF) codes, are known, and can be deployed within the scope of the present invention.) Decovered symbols are accumulated for a variety of channels, channel 1 through channel K, 548A–548K respectively, using adder 546 and multiplexor 550, in similar fashion as described above with respect to FIG. 3B.

To handle the scheduling of finger processing in offline processing unit 410, counters 510A–510N are deployed, labeled finger 1 counter through finger N counter, respectively. In the exemplary embodiment counters 510A–510N are 18-bit counters clocked at chip×8. The 18-bit width is designed to handle the 32,768-chip length of the PN sequences used in the cdma2000 system with ⅛ chip resolution (15 bits for the PN sequence, and an additional 3 bits for the ⅛ chip resolution). Other counter widths can be deployed to handle various PN sequences used in alternate CDMA systems. Note that these exemplary counters are also suitable for IS-95 systems.

The clock supplied to each counter 510A–510N is also used to clock data into the sample RAM 532, so each counter advances one unit for each sample that enters the sample RAM 532. Each counter 510A–510N maintains the timing for a particular finger. Thus the difference between the counter values reflects the time difference in arrival between the various paths the fingers are tracking. For example, if the counter for finger N 510N lags the counter for finger 1 510A by 64 chip×8 units, then the path being received on finger N lags the path being received on finger 1 by 8 chip units, or 6.51 microseconds at a chip rate of 1.2288 Mcps. In other words, the phase of each finger counter 510A–510N is aligned with the phase of the PN sequence embedded in the received signal. As described, the exemplary embodiment deploys a separate counter to record timing for each finger. Alternative embodiments are possible that use a single counter with several delay lines or masks to record timing for each finger (details not shown).

Each finger counter 510A–510N issues a request to the offline processing unit 410 on a processing cycle boundary, which corresponds to a boundary of 1 or more symbols. It will be understood that the number of chips per symbol may vary between different CDMA systems. In the exemplary embodiment the symbols for normal traffic are 64 chips. Note that some channels, such as the secondary data channel, have a range of symbol widths ranging from 4 to 128 chips. In the exemplary embodiment, processing requests can be made by each finger counter 510A–510N every 64 chips by detecting when bit 9 of the counter toggles (where the least significant bit (LSB) is defined as bit 0). Alternatively, the request can be made when all 9 LSBs are detected as 0. Other detection mechanisms are known and fall within the scope of the present invention. For another example, with 128-chip symbols, the processing cycle boundary can be detected when bit 10 of a counter toggles, or when the 10 LSBs are equal to 0. Since processing requests from different counters can occur simultaneously, interrupt controller 520 is deployed to intercept the various requests from finger counters 510A–510N and arbitrate between them. One of the conflicting requests will be processed first while the other requests are kept pending. Interrupt controller 520 issues the processing request, or interrupt, to control unit/finger parameter storage 560 in offline processing unit 410.

Control unit/finger parameter storage 560 configures the offline processing unit 410 for the finger to be serviced. It supplies an address to start reading out of the sample RAM 532, an address to read out of the IQ PN memory 540 for despreading, the rotator value (if a rotator 536 is deployed), the Walsh functions for use in Walsh decover 542, and the lengths to use for decovering the despread samples. Most of these parameters are setup in control unit/finger parameter storage 560 by DSP 430 (through the connection labeled parameter configuration), and are stored locally to facilitate configuration of the offline processing unit 410 for servicing the various fingers.

Figure 7:
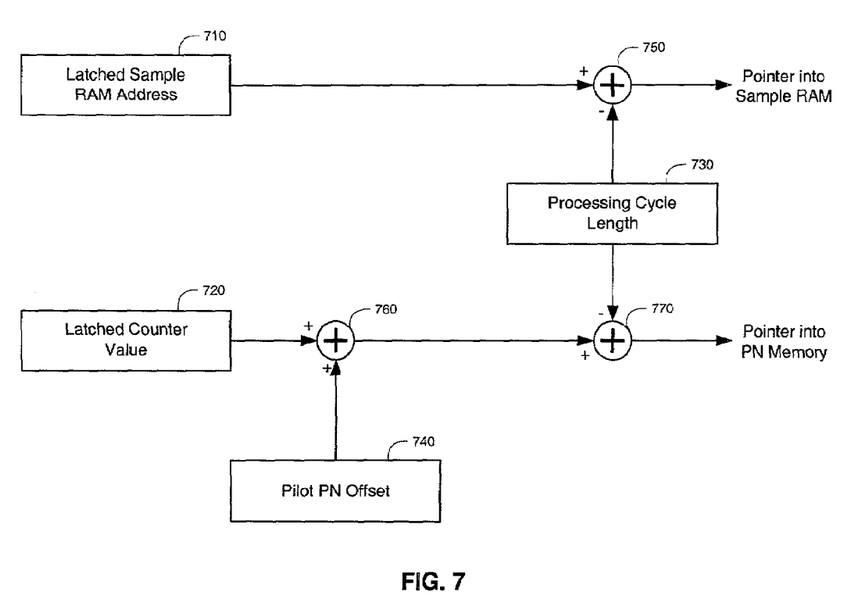
FIG. 7 is a block diagram of the address computation portion of an offline processing control unit.

The sample RAM 532 read address and IQ PN memory 540 address can be derived by latching the values for the finger counter 510A–510N being serviced on the processing cycle boundary. FIG. 7 depicts means for computing these addresses in the exemplary embodiment. The sample RAM address can be computed by subtracting the duration of the processing cycle from the latched sample RAM address. This is shown in FIG. 7 as subtracting processing cycle length 730 from latched sample RAM address 710 using adder 750 to produce the pointer into the sample RAM 532. For example, if the processing cycle is 64 chips, then 64×8=512 chip×8 samples were input into the sample RAM since the last processing request. If the latched sample RAM address is 1536, then subtract 512 from 1536 to obtain a read pointer value of 1024.

The pointer into the PN memory is computed similarly, except that, in the exemplary embodiment, the pilot PN offset must be accounted for. The pilot PN offset is a base-station specific value that is used in cdma2000 systems to distinguish different base stations, while allowing the use of the same PN sequence across all base stations. To remove the effect of the pilot PN offset, the offset for that base station must be added to the latched counter value and the length of the processing cycle is subtracted to obtain the read pointer into the PN memory. This is shown in FIG. 7 as adding latched counter value 720 to pilot PN offset 740 in adder 760, then subtracting processing cycle length 730 in adder 770 to produce the pointer into IQ PN memory 540. For CDMA systems that do not employ a pilot PN offset, the step of adding the pilot PN offset is not necessary. Returning to FIG. 5, once the offline processing unit 410 has finished processing the symbols, they are sent via direct memory access (DMA) controller 570 into the DSP 430 and an interrupt is issued to the DSP 430 from the control unit/finger parameter storage 560 when the DMA is complete. In an alternative embodiment, the output symbols may be stored into a register bank or a RAM that is memory mapped in the DSP address space, and DSP 430 reads the symbols after receiving the interrupt. The DSP 430 performs tasks such as symbol demodulation, combining, and power control processing. The DSP 430 also implements the synchronization loops for finger time and frequency tracking. DSP 430 can slew a finger counter 510A–510N backwards or forwards by ⅛ chip to adjust the finger timing, and it can change the value sent to the rotator for frequency tracking. After the symbols have been demodulated and combined across fingers, the DSP 430 outputs the symbols to deinterleaver/decoder 240. As described above, demod/combiner engine 440 can optionally be deployed to perform higher rate symbol processing.

Figure 8:
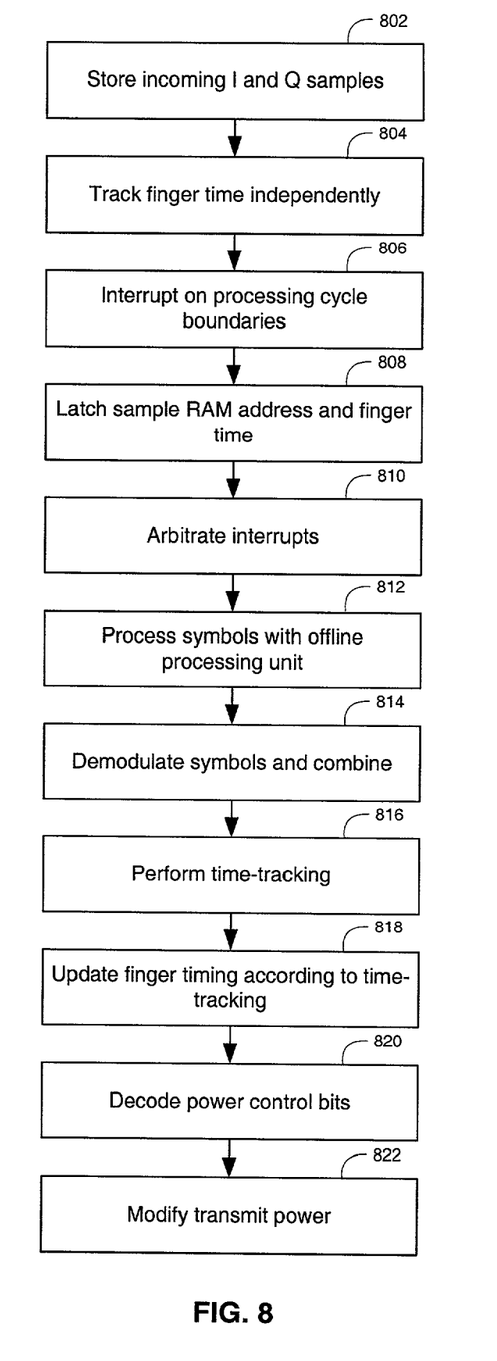
FIG. 8 is a flowchart depicting an embodiment of a method for offline CDMA demodulation.

FIG. 8 depicts an exemplary embodiment of a method for performing offline CDMA demodulation. In step 802, incoming I and Q samples are stored for offline processing. In step 804, timing for each finger is tracked independently. In the exemplary embodiment, this step is carried out using a counter for each finger. In step 806, interrupt on processing cycle boundaries. In the exemplary embodiment, the processing cycle boundary is a 64-chip symbol. In step 808, the sample RAM address and finger time are latched on the processing cycle boundary. In the exemplary embodiment, the finger counter value and sample RAM address are latched on symbol boundaries. In step 810, arbitrate between finger interrupts if more than one should occur simultaneously. Proceed to step 812 and process the symbols using an offline processing unit 410. In finger interrupt arbitrage situations, defer the processing of remaining fingers until after the first finger's processing is complete. In step 814, perform symbol rate demodulation and combine the symbols of the various fingers to produce a symbol output. The symbol outputs can be delivered to a deinterleaver and/or decoder for further processing.

Coincident to the previously described steps, perform time-tracking for each finger in step 816. Update finger timing according to the time-tracking in step 818. In the exemplary embodiment, time tracking is accomplished by a DSP issuing advance and retard commands to advance or retard each finger counter by the appropriate number of ⅛ chips.

Coincident to step 814, demodulating and combining symbols, decode power control bits that have been punctured into the data stream in step 820. In step 822, modify the transmit power according to the power control bits within the maximum latency time allowed by the system. In the exemplary embodiment, the system is a cdma200 system and the transmitter power level must be within 0.3 dB of its final value within 500 microseconds of the receipt of a power control bit.

In the preceding discussion, various methods and embodiments of an offline CDMA demodulator have been described. An offline CDMA demodulator has been compared with a traditional real-time finger architecture, in which an entire finger datapath must be added to scale for increased finger capacity. In general, for each additional finger, this includes an additional decimator, rotator, despreader, PN generator, Walsh generator and decover unit, adder for accumulation, K accumulator registers to support K simultaneous channels, and all the associated finger parameter storage. In contrast, to expand the finger capacity of the offline CDMA demodulator just described, the only additional hardware needed to support an additional finger is a counter (or delay line or mask), an additional input to the interrupt controller and associated arbitration logic to support the new finger, and some additional finger parameter storage. The clock rate deployed in the offline processor may need to be increased to support the additional finger. These aspects benefit CDMA systems which require additional finger capacity, while independent finger timing, as described, allows for maintenance of stringent latency requirements on symbol processing, such as power control.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A CDMA demodulator, comprising:
a finger timing unit for generating signals indicating cycle boundaries for a plurality of fingers;
an offline processing unit for receiving and storing samples and processing symbols from the stored samples for the plurality of fingers in response to the cycle boundary signals; and
a digital signal processor (DSP) for symbol demodulating and combining the processed symbols corresponding to the plurality of fingers.

2. A CDMA demodulator, comprising:
a finger timing unit for generating signals indicating cycle boundaries for a plurality of fingers;
an offline processing unit for receiving and storing samples and processing symbols from the stored samples for the plurality of fingers in response to the cycle boundary signals; and
an engine for symbol demodulating and combining high rate symbols corresponding to the plurality of fingers.

3. A CDMA demodulator, comprising:
a memory for storing samples according to a memory address;
a finger timing unit for producing a time reference for each of a plurality of fingers and producing a plurality of processing cycle boundary signals therefrom;
a register for storing the memory address in response to a processing cycle boundary signal; and
a sample processor for processing samples from the memory identified in accordance with the stored memory address, the sample processing initiated in response to the cycle boundary signal, wherein the finger timing unit comprises a plurality of counters for producing the time reference for each of the plurality of fingers.

4. A CDMA demodulator, comprising:
a memory for storing samples according to a memory address;
a finger timing unit for producing a time reference for each of a plurality of fingers and producing a plurality of processing cycle boundary signals therefrom;
a register for storing the memory address in response to a processing cycle boundary signal; and
a sample processor for processing samples from the memory identified in accordance with the stored memory address, wherein the location of samples in the memory for processing in the sample processor is computed by subtracting the processing cycle length from the stored memory address.

5. The demodulator of claim 4, wherein the finger timing unit comprises a plurality of counters for producing the time reference for each of the plurality of fingers.

6. A CDMA demodulator, comprising:
a memory for storing samples according to a memory address;
a finger timing unit for producing a time reference for each of a plurality of fingers and producing a plurality of processing cycle boundary signals therefrom, wherein the finger timing unit comprises a single counter and a plurality of masks for producing the time reference for each of the plurality of fingers;
a register for storing the memory address in response to a processing cycle boundary signal; and
a sample processor for processing samples from the memory identified in accordance with the stored memory address.

7. The demodulator of claim 6, wherein the processing cycle boundary signal is a symbol.

8. A CDMA demodulator, comprising:
a memory for storing samples according to a memory address;
a finger timing unit for producing a time reference for each of a plurality of fingers and producing a plurality of processing cycle boundary signals therefrom;
a register for storing the memory address in response to a processing cycle boundary signal; and
a sample processor for processing samples from the memory identified in accordance with the stored memory address,
wherein the sample processor comprises:
a pseudo-random noise (PN) generator for generating PN values; and
a despreader for despreading the samples with the PN values to produce despread samples.

9. The demodulator of claim 8, further comprising a register for storing the time reference corresponding to and in response to a processing cycle boundary signal.

10. The demodulator of claim 9, wherein the PN generator comprises a memory, loaded wit the PN sequence values, which is addressed in accordance with the stored time reference.

11. The demodulator of claim 10, wherein the address is computed by subtracting the processing cycle length from the stored time reference.

12. The demodulator of claim 10, wherein the address is computed by adding a base station specific offset to the stored time reference and subtracting the processing cycle length from the result thereof.

13. The demodulator of claim 8, wherein the sample processor further comprises:
a Walsh generator for generating Walsh chips; and
a Walsh decover for decovering to despread samples to produce decovered samples.

14. The demodulator of claim 13, wherein the sample processor further comprises an accumulator for accumulating the decovered samples for one or more channels.

15. A CDMA demodulator, comprising:
a memory for storing samples according to a memory address;
a finger timing unit for producing a time reference for each of a plurality of fingers and producing a plurality of processing cycle boundary signals therefrom;
a register for storing the memory address in response to a processing cycle boundary signal;

a sample processor for processing samples from the memory identified in accordance with the stored memory address; and an interrupt controller for arbitrating between the plurality of processing cycle boundary signals.

16. A CDMA demodulator, comprising:

a memory for storing samples according to a memory address;

a finger timing unit for producing a time reference for each of a plurality of fingers and producing a plurality of processing cycle boundary signals therefrom;

a register for storing the memory address in response to a processing cycle boundary signal;

a sample processor for processing samples from the memory identified in accordance with the stored memory address; and a DSP for processing and combining the results of the sample processor.

17. The demodulator of claim 16, farther comprising a direct memory access (DMA) controller for delivering the output of the sample processor to the DSP.

18. A method of CDMA demodulation, comprising:

storing received I and Q samples in a memory according to a memory address;

producing a time reference for a plurality of fingers;

generating interrupts on processing cycle boundaries according to the plurality of time references;

processing stored samples using an offline processing unit;

latching the memory address upon generating an interrupt; and accessing the stored samples for processing using an address generated from the latched memory address.

19. A method of CDMA demodulation, comprising:

storing received I and Q samples in a memory according to a memory address;

producing a time reference for a plurality of fingers;

generating interrupts on processing cycle boundaries according to the plurality of time references;

processing stored samples using an offline processing unit; and arbitrating between simultaneous assertions of interrupts corresponding to one or more of the plurality of time references.

20. A method of CDMA demodulation, comprising:

storing received I and Q samples in a memory according to a memory address;

producing a time reference for a plurality of fingers;

generating interrupts on processing cycle boundaries according to the plurality of time references;

processing stored samples using an offline processing unit; and symbol demodulation and combining of the results of the offline processing unit in a DSP.

21. The method of claim 20, further comprising:

performing time tracking for the plurality of time references in the DSP; and updating the plurality of time references in accordance with the time tracking.

22. The method of claim 20, further comprising:

performing power control decoding in the DSP; and modifying transmit power in accordance with the power control decoding.

* * * * *